(12) United States Patent
Simoes (10) Patent No.: US 8,702,111 B2
(45) Date of Patent: Apr. 22, 2014

(54) STACKABLE AND COLLAPSIBLE TROLLEY CART SYSTEM

(76) Inventor: Paulo J. Simoes, Oakville (CA)

( * ) Notice: Subject to any disclaimer, the term of this patent is extended or adjusted under 35 U.S.C. 154(b) by 0 days.

(21) Appl. No.: 13/319,325

(22) PCT Filed: May 6, 2010

(86) PCT No.: PCT/CA2010/000711
§ 371 (c)(1),
(2), (4) Date: Jan. 20, 2012

(87) PCT Pub. No.: WO2010/127453
PCT Pub. Date: Nov. 11, 2010

(65) Prior Publication Data
US 2012/0119458 A1 May 17, 2012

Related U.S. Application Data

(60) Provisional application No. 61/175,936, filed on May 6, 2009.

(51) Int. Cl.
*B62D 39/00* (2006.01)

(52) U.S. Cl.
USPC .............. 280/33.998; 280/47.18; 280/35

(58) Field of Classification Search
USPC ............ 280/79.11, 79.2, 33.998, 33.991, 280/33.997; 220/1.5, 4.26–4.28
See application file for complete search history.

(56) References Cited

U.S. PATENT DOCUMENTS

| | | |
|---|---|---|
| 3,698,733 A | 10/1972 | Isaacs |
| 3,953,047 A | 4/1976 | Morgan |
| 4,248,442 A | 2/1981 | Barrett |
| 4,492,388 A | 1/1985 | de Wit |
| 4,811,968 A | 3/1989 | Bolden |
| 5,375,860 A | 12/1994 | Ernsberger |
| 6,042,128 A | 3/2000 | Dinkins |
| 6,199,874 B1 | 3/2001 | Galvin |
| 6,328,329 B1 | 12/2001 | Smith |
| D471,381 S | 3/2003 | Yamaguchi |

(Continued)

FOREIGN PATENT DOCUMENTS

EP    1180463    2/2002

OTHER PUBLICATIONS

Abstract; EP1733947(A2); Duerr, W.; Dec. 20, 2006.
Stackable/Collapsible Wire Basket Carts; Carico Systems; Internet web page; p. 1; Mar. 22, 2009.
Clax Cart 2 Tier Collapsible Folding Trolley; Cox Product Catalogue & Enquiry; Internet web page; p. 1; Mar. 22, 2009.

(Continued)

*Primary Examiner* — John Walters
*Assistant Examiner* — James Triggs
(74) *Attorney, Agent, or Firm* — Gerald A. Gowan; Gowan Intellectual Property (57) ABSTRACT

A stackable and collapsible trolley assembly having at least one collapsible transport container, and a support structure on which the transport container rests. The support structure is moveable on wheels. Additional transport containers can be rested on the assembly, and preferably, are arranged so that a recessed edge at the bottom of a second transport container fits within the open perimeter of the first transport container. The wheels on the support structure are all located inside of the recessed edge, so that the trolley assembly wheels will be located within the opening of a transport container when the trolley assembly is positioned on top of a transport container.

4 Claims, 7 Drawing Sheets

(56) References Cited

U.S. PATENT DOCUMENTS

| | | |
|---|---|---|
| 6,676,141 B1 | 1/2004 | Hadley |
| 6,926,194 B2 | 8/2005 | Lane |
| 6,983,946 B2 | 1/2006 | Sullivan |
| 7,360,784 B2 * | 4/2008 | Stewart et al. ............... 280/656 |
| 7,431,172 B1 | 10/2008 | Spindel |
| 7,530,580 B2 * | 5/2009 | Holgesson ................. 280/79.11 |
| 2004/0195793 A1 * | 10/2004 | Sullivan et al. ............ 280/79.11 |
| 2005/0006861 A1 | 1/2005 | Dubois et al. |
| 2006/0245876 A1 | 11/2006 | Hopkins et al. |
| 2006/0277867 A1 | 12/2006 | Holgesson |
| 2009/0078700 A1 * | 3/2009 | Boivin ........................ 220/4.28 |

\* cited by examiner

STACKABLE AND COLLAPSIBLE TROLLEY CART SYSTEM

CROSS REFERENCE TO RELATED APPLICATIONS

This application is derived from PCT application No. PCT/CA2010/000711, filed May 6, 2010, which claims priority to U.S. Provisional Patent Application Nos. 61/175,936, filed May 6, 2009, the entire contents of which documents are expressly incorporated herein by reference.

FIELD OF THE INVENTION

The present invention relates to the field of transport trolleys or carts, and in particular, relates to a stackable and collapsible trolley cart system.

BACKGROUND OF THE INVENTION

Transport dollies are commonly used for transporting various items, including cube-shaped containers, boxes, cases, stackable transport boxes, or more generally, any object which the user does not wish to carry. For a typical flat panel dolly, a support plate is used having attached wheels which roll across a surface. The upper side of the support plate acts as a supporting surface for the item to be transported. A handle may optionally be provided to pull, push or otherwise direct the trolley.

In one known trolley system, as described in US Patent Publication No. 2005/0006861, the dimensions of the supporting surface and the arrangement of the transported items are preferably chosen in such a way that two transport boxes can be positioned on the supporting surface, adjacent to one another, but without contacting each other. Additional transport boxes can be stacked on top of the first set of adjacent boxes, to provide additional storage space.

The transport boxes described in US 2005/0006861 comprise two top cover halves which are each rigidly hinged on the longitudinal side walls of the transport boxes. When full, the transport boxes are first arranged next to each other, and then, stacked above one another. During transport of the empty transport boxes however, the transport boxes are opened so as to allow them to be stacked into each other in a compact fashion. However, the stack of empty transport boxes is at least as large as one transport box, and the supporting trolley. As such, it is inconvenient to carry or store this assembly, or to transport this assembly when the transport boxes are empty.

As such, while this system provides some advantages over the prior art, it is still inconvenient to travel with the full sized empty containers and trolley, even though the transport boxes have been stacked one into another. Further, when moved to the desired location, the boxes can be removed from the trolley and stacked for storage, but it is still necessary to separately store the supporting trolley. Accordingly, it would be beneficial to provide a transportable trolley system which was more easily moved when the transport boxes were empty, or which can be more easily stored, when it was desired to stack and not move the supporting trolley.

SUMMARY OF THE INVENTION

It is therefore an object of the present invention to provide a stackable and collapsible trolley system with one or a plurality of collapsible transport containers, which containers can optionally be releasably attached to the base trolley assembly.

It is a further object of the present invention to provide a stackable and collapsible trolley system in which the base trolley assembly can be stacked and stored within a transport container, in a position wherein the wheels of the base trolley assembly are positioned within the trolley system, and therefore, not in contact with the ground.

The advantages set out hereinabove, as well as other objects and goals inherent thereto, are at least partially or fully provided by the present invention, as set out herein below.

Accordingly, in one aspect, the present invention provides a trolley system for moving at least one collapsible transport container, the system comprising:

(a) a base trolley assembly having a preferably substantially rectangular support structure and having an upper bearing surface for receiving and/or supporting a transport container, the support structure being movable on a plurality of support wheels;

(b) a first handle attached to said base trolley assembly to push, pull or otherwise direct the trolley system on said wheels; and (c) at least one collapsible transport container which is fitted to said bearing surface, and adapted to receive and support additional collapsible transport containers.

In a preferred embodiment, the inventive trolley system comprises locking mechanisms to releasably lock the first or lowest collapsible transport container to the base trolley assembly. More preferably, however, the first, or lowest, transport container is "permanently" affixed to the support structure of the base trolley assembly by use of any suitable means, such as for example, screws, bolts, welds, glue, locking pins, or the like. As such, in the preferred embodiment, the trolley system of the present invention comprises a collapsible transport container which is permanently fitted to the support structure of the base trolley assembly. In one embodiment, the support structure of the base trolley assembly can even be integrated into the collapsible transport container.

The bearing surface of the support structure of the base trolley assembly can be provided with a cuboid recess, which is adapted to receive and hold at least part of the collapsible transport container. Alternatively, though, the bearing surface can have an essentially flat surface, on which the collapsible transport container merely rests.

The collapsible transport containers are preferably rectangular boxes of the type having medial hinges on each of their side surfaces, and end surfaces which swing on top hinges so as to move out of the way. In operation, to close the open collapsible transport container, the end surfaces are rotated using the top hinges, and the side surfaces are folded using the medial hinges. By using the medial hinges, the sides are essentially collapsed, which brings the top and bottom portions of the collapsible transport container, together, and thus provide an essentially flat, collapsed transport container. To reverse the process, the side surfaces are straightened using the medial hinge, and the end surfaces are swung into place to lock the side surfaces in place by a friction fit. An example of one suitable collapsible transport container is commercially available from Shinwa under the trade name "Down Box BS-30". A further example of a suitable container is shown in U.S. Pat. No. 6,926,194. However, a variety of collapsible containers might be used.

The collapsible transport containers used in the present invention also preferably include a recessed bottom edge which is adapted to fit within the open upper surface of a similar collapsible transport container so that the collapsible transport containers can be more easily stacked and held in place, one on top of another. Preferably, this stackability is provided when the collapsible transport containers are in both an open and closed configuration so that a series of closed or open containers can be stacked and held in place, one on top of another, either in an open or in a closed configuration.

The support wheels, which are located on a bottom surface of the support structure, are preferably located so that the wheels will fit within the open area at the top of an open collapsible container. As such, the support structure can be stacked on top of an open transport container without interference from the wheels.

In a further preferred embodiment, the support structure also has, or forms, a recessed bottom edge on the bottom surface which recessed bottom edge is adapted to fit into the upper surface of an open, collapsible container. With this embodiment, the wheels are all preferably positioned within the area defined by the recessed edge on the bottom surface of the support structure.

When the support structure is stacked on top of an open transport container with the wheels fitted within the open transport container, the collapsible and stackable trolley system of the present invention can be stacked in such a manner that the wheels are off of the ground. Consequently, the stacked assembly is less likely to move.

Additional transport containers can be stacked one on top of another on the trolley system. While the number of transport containers that can be stacked will vary depending on sizes, construction materials, and the like, typically the number of additional stacked collapsible containers is between 1 and 10, and more preferably, between 1 and 5.

The additional transport containers can merely rest one on top of another. Preferably, though, a series of straps and clips are provided on the sides of the collapsible container and affixed to the support structure, and which are also attachable to the sides of any additional collapsible containers such that any or all of the additional collapsible transport containers can be releasably affixed to the trolley system.

The trolley system also preferably comprises a retractable carrying handle for carrying the entire trolley system when required, or for lifting it into spaces such as a storage area, a vehicle trunk, or the like.

The support wheels can be any suitable wheels, but preferably are a caster-style wheel. The support wheels can be fixed in-line, or can swivel. Preferably, the trolley is fitted with at least two swivel-type casters at one end to allow the trolley to be more easily turned. More preferably, the trolley comprises four swivel-type casters fitted at each corner of the trolley.

The support wheels are preferably fitted to each corner of the bottom surface of the trolley. As indicated above, all wheels are preferably located so that they will fit within the open area of a collapsible transport container. This will be within the bottom recessed edge on the bottom surface of the support structure, when such an edge is provided.

The support structure of the trolley and any or all of the collapsible containers can be made of any suitable materials, including plastic, metals, wood or wood products such as wood laminates, or any other materials. Preferably, however, the major components of the system are manufactured from plastic, and most preferably, from recycled or reprocessed plastic.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention. Moreover, it will be expressly understood that, unless otherwise specifically noted, all of the features described herein may be combined with any of the above aspects, in any combination.

Figure 1:
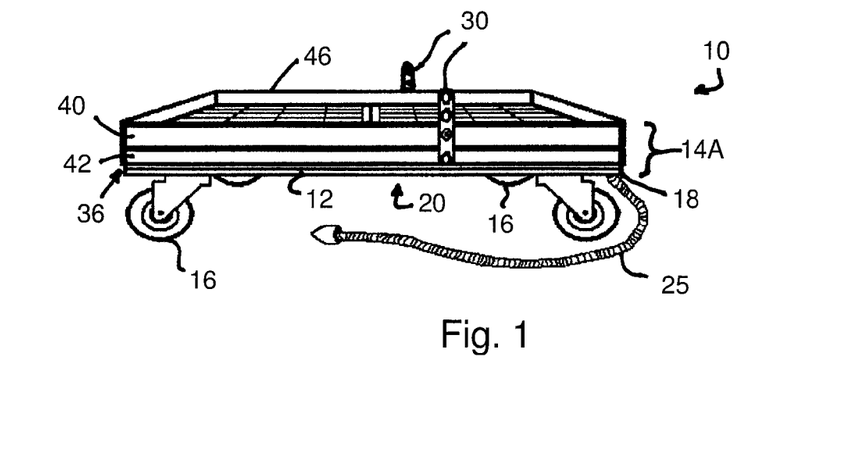
FIG. 1 is a perspective side view of a trolley and collapsible container of the collapsible and stackable trolley system of the present invention, in a closed orientation.

Referring to FIG. 1, a trolley system 10 is shown having a base trolley assembly 12, and a first collapsible transport container 14A. Trolley 12 has a support structure 18, which is a flat, rectangular and rigid piece or reprocessed plastic. Support structure 18 is fitted with four swivel-caster support wheels 16 positioned at each corner of the bottom surface 20 of support structure 18. Support structure 18 includes a recessed edge 36 around the perimeter of support structure 18, and wheels 16 are affixed within the perimeter formed by edge 36. Preferably, at least one wheel 16 includes a releasable locking device (not shown) to lock trolley system 10 in a given location.

A rope handle 25 is provided at one end of base trolley assembly 12, in which to pull the trolley system 10. Handle 25 is shown as a flexible nylon rope, but can be replaced with any suitable handle, including a retractable and extendable handle, or a fixed handle (not shown), so as to facilitate movement of the trolley system 10.

First collapsible transport container 14A is essentially permanently attached to the top, bearing surface of support structure 18 of base trolley assembly 12 using bolts (not shown), and container 14A is shown in FIG. 1 in a closed configuration (or orientation).

Support structure 18 and collapsible container 14A preferably have substantially the same length and width, with support structure 18 being slightly smaller so as to create or maintain a recessed edge 36 around the bottom of collapsible container 14A. Typically, the length and width of the collapsible container 14A can vary depending on the application, but preferably collapsible container 14A has a length of between 25 cm and 1.5 m, and a width of between 10 cm and 100 cm. More preferably, however, collapsible container 14A has a length of between 30 cm and 100 cm, and a width of between 20 and 60 cm.

The length and width of support structure 18 is preferably up to 1 to 3 cm less than the corresponding length and width of collapsible container 14A, so as to form, and/or maintain a recessed edge 36.

The height of base trolley assembly 12, including wheels 16, is preferably between 2.5 and 30 cm, but most preferably is between 7.5 and 20 cm.

The height of collapsible container 14A is preferably between 2.5 and 10 cm, when closed (as shown in FIG. 1), and between 7.5 and 40 cm, when open.

Collapsible container 14A has an upper frame 40 and a lower frame 42 around the perimeter of the container. Upper frame 40 forms a perimeter edge 46 around the opening of collapsible container 14A, into which a recessed edge 36 from another collapsible container can be inserted, as described hereinbelow.

Clips 32 are provided on each side of container 14A into which retaining straps can be inserted, in order to hold additional containers in place, as will be described hereinbelow.

Figure 2A:
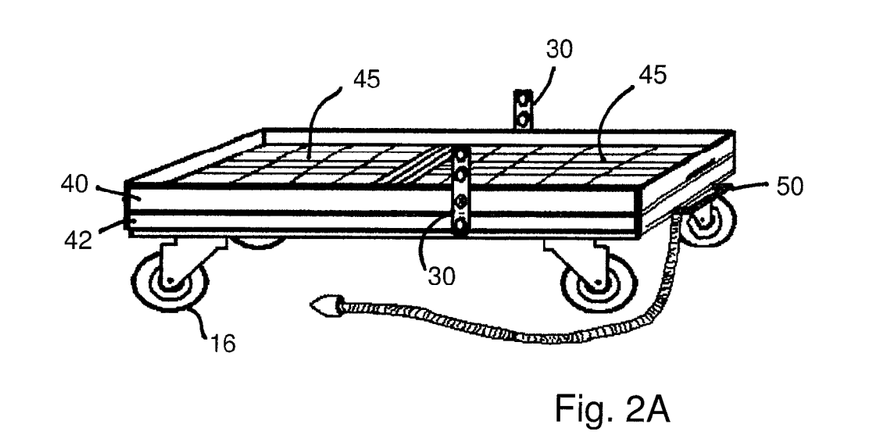
FIG. 2 is a series of three drawings, shown from a perspective end view, that show the opening of the preferred collapsible container used in the trolley system of the present invention.
Figure 2B:
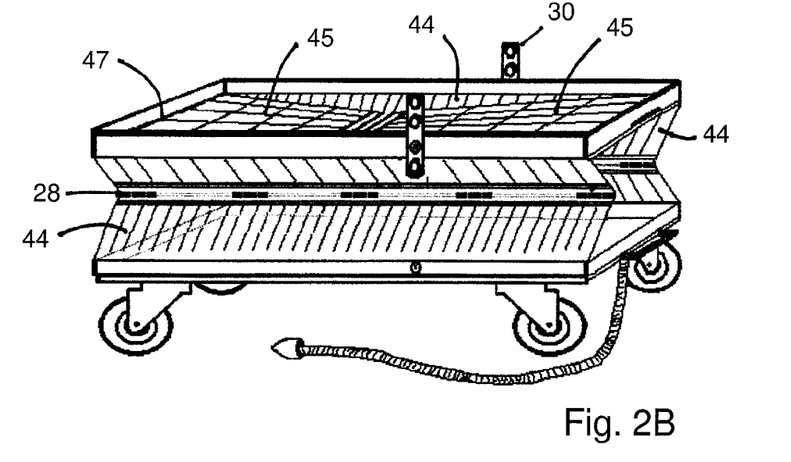
Figure 2C:
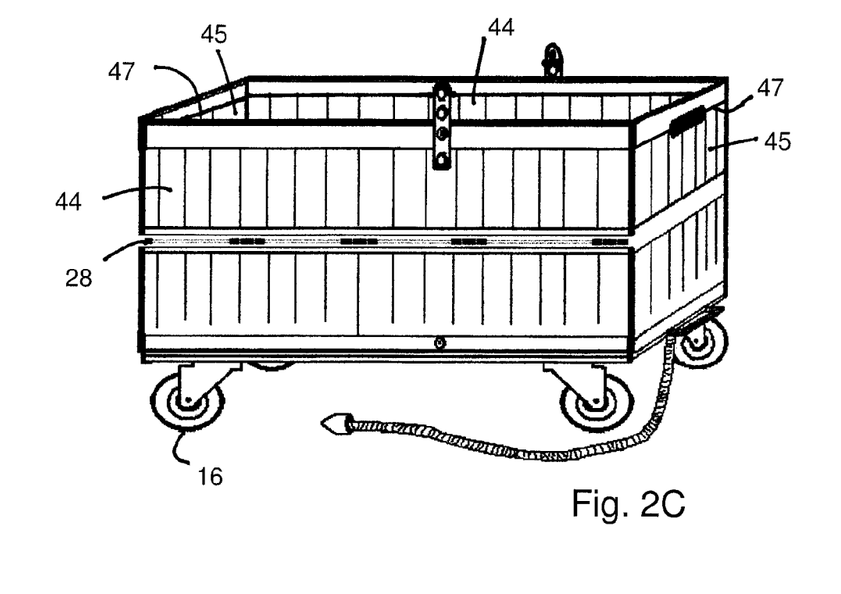

The mechanism by which collapsible container 14A is moved from a closed to an open configuration is shown in FIGS. 2A, 2B and 2C.

In FIG. 2A, an end perspective view of the trolley system 10 of FIG. 1 is shown. The trolley system in FIG. 2A is shown in a closed configuration, as previously discussed.

In FIG. 2B, upper frame 40 has been raised slightly away from lower frame 42. This reveals show side portions 44 and end portions 45 of container 14A. Side portions 44 and end portions 45 are preferably constructed from plastic so as to form a grid shaped pattern. At the middle of side portions 44 are medial hinges 28. At the top of end portions 45 are top hinges 47. Using medial hinges 28 and top hinges 47, side portions 44 and end portions 45 can be moved, and thus, container 14A can be reversibly transformed from a closed to an open position, as follows.

As upper frame 40 is raised, medial hinge rotates to allow side portion 44 to straighten. When side portions 44 are essentially straight, end portions 45 are allowed to rotate around upper hinge 47 and allow end portions 45 to fall within the confines of collapsible container 14A.

In FIG. 2C, upper frame 40 has been raised to its maximum height. At this point, side portions 44 are substantially flat. End portions 45 have also swung down to be substantially vertical, and perpendicular to side portions 44. End portions 45 are held in place by a friction fit against side portions 44, or alternatively by retention clips (not shown) provided for this purpose.

In the open configuration, upper and lower frames (40, 42) of container 14A are now separated their maximum distance, and the collapsible container 14A, is now in an open configuration. Transport container 14A can be filled with whatever goods are desired to be moved.

Collapsing of container 14A is achieved by rotating end portions 45 upwards to be located with upper frame 40, and then pushing side portions 44 inwards so as to cause both side portions 44 to fold inward. Upper frame 40 collapses until it is again adjacent to lower frame 42.

The skilled artisan will, however, be aware that other types of collapsible containers, known in the art, might be used in place of the collapsible transport containers described herein.

Figure 3:
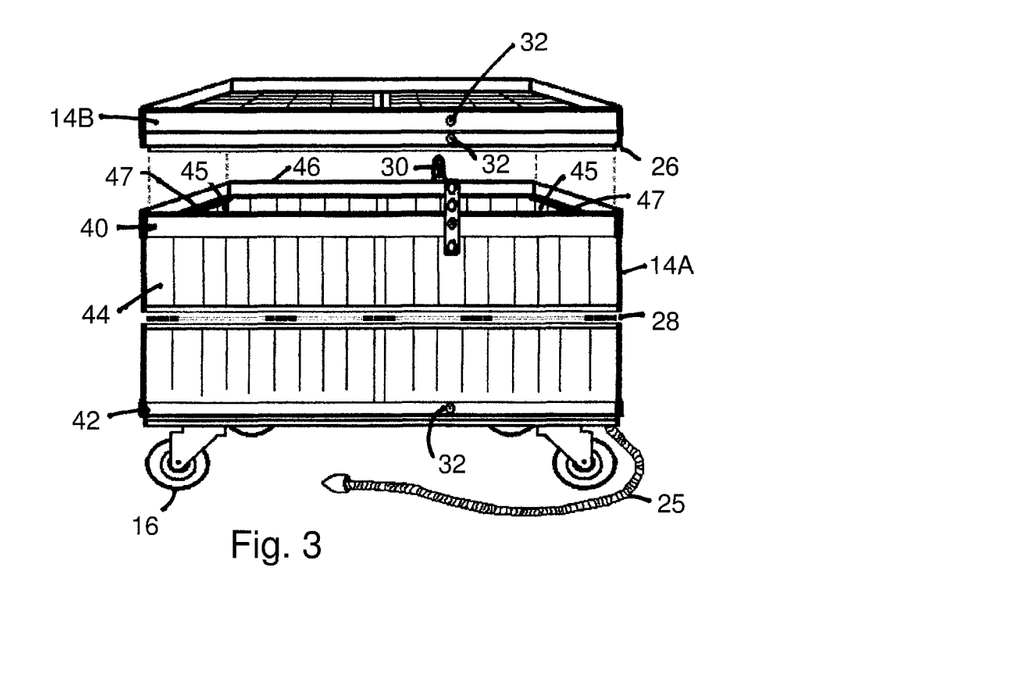
FIG. 3 is a perspective side view of the trolley system of FIG. 1 in an open orientation, with a second, and additional collapsible container in a closed orientation, which is positioned to be fitted to the trolley system.

In FIG. 3, the first collapsible transport container 14A of the trolley system of FIG. 1, is in an open configuration. A second, additional collapsible container 14B, of the same general type as container 14A, and being in a closed configuration, is shown in position for placement on the top of the opening of container 14A. The dashed lines represent the alignment of the two containers 14A and 14B. A recessed edge 26 is shown around the perimeter of the bottom of container 14B, and edge 26 is adapted to fit within the perimeter edge 46 at the top of container 14A.

A strap 30, which is preferably a nylon strap, is fitted to collapsible container 14A using snap clips 32 which are preferably located on each of the upper and lower frames (40, 42) of containers 14A and 14B. Strap 30 has a series of snap clips which can be used in combination with clips 32 in order to hold collapsible containers together, or to hold collapsible containers in a closed orientation. Strap 30 can be permanently fitted to collapsible container 14A, but can also be provided as a removable attachment that can be used at any suitable location.

Clips 32 are shown as snap fit buttons, but it is clear that any suitable locking means can be used. These include simple hooks, pins, Velcro fasteners, or the like, which are used to assist in holding the open and/or close collapsible container together, when desired. This feature is particularly relevant when the entire trolley system 10 is lifted or carried, as described hereinbelow.

Figure 4:
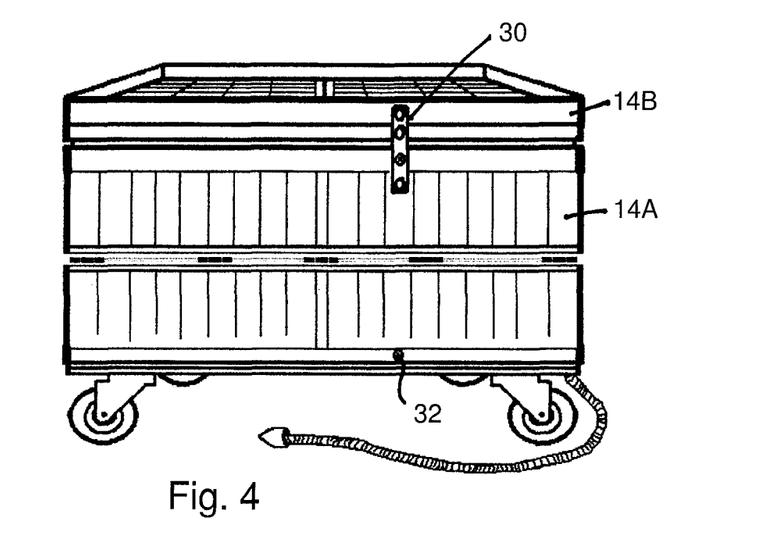
FIG. 4 is a perspective side view of the trolley system arrangement shown in FIG. 3, wherein the second, and additional collapsible transport container, has been fitted to the trolley system.

In FIG. 4, container 14B from FIG. 3 has been placed on top of container 14A so that recessed edge 26 fits within the open section of container 14A, and thus, within perimeter 46. While insertion of recessed edge 26 within perimeter 46 is usually sufficient to hold containers 14A and 14B together, strap 30 can also be used to attach containers 14A and 14B together using clips 32.

Preferably, a strap 30 is used on both side of containers 14A and 14B using clips 32 located on both sides.

Figure 5:
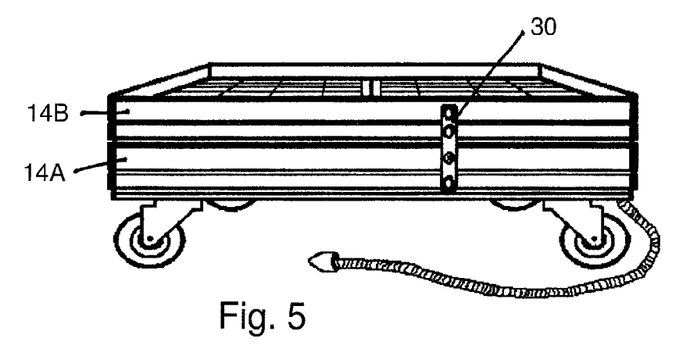
FIG. 5 is a perspective side view of the trolley system of FIG. 4, wherein both collapsible transport containers are in a closed orientation.

In FIG. 5, the trolley system shown in FIG. 4 is shown, but in this figure, collapsible containers 14A and 14B are both shown in a closed configuration. In this example, a single strap 30 is able to extend to cover both of the two clips 32 on one side of container 14A and the two clips 32 on the same side of container 14B. By having strap 30 cover all of the clips 32 on one or both sides of container 14A and container 14B, both containers are held securely together. Additionally, both containers 14A and 14B are held in the closed configuration.

Figure 6:
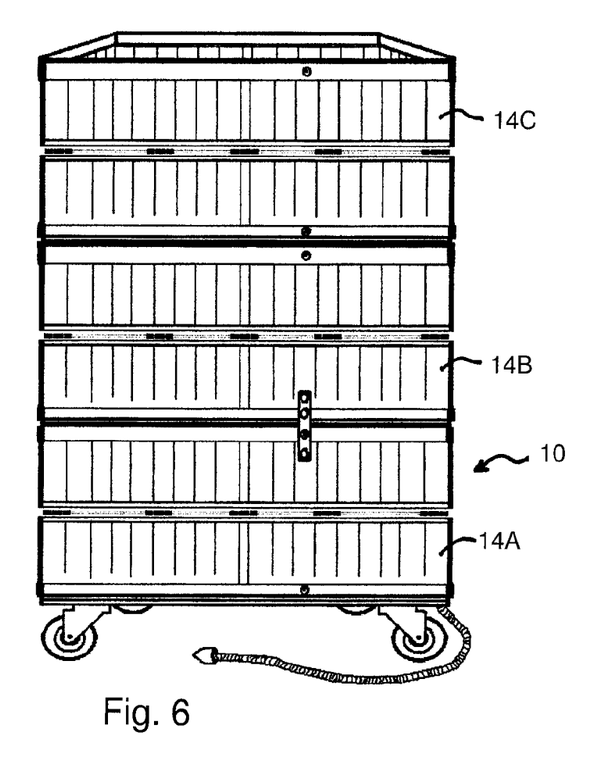
FIG. 6 is a perspective side view of the trolley system having a total of three collapsible transport containers, all of which are in an open orientation.

In FIG. 6, a further embodiment is shown similar to that of FIG. 5, but in this figure, both containers 14A and 14B are shown in an open configuration. Further, an additional collapsible container 14C is also shown. Container 14C is identical to container 14B, and nests into container 14B using recessed edge 26. Nylon strap 30 is used to hold containers 14A and 14B together, but it is clear that an additional nylon strap (not shown) can be used to hold containers 14B and 14C together, in the same manner previously described.

It will also be clear that additional containers (not shown) can be added to the top of the trolley system shown in FIG. 6. Preferably, any and all additional containers will also be identical to container 14B.

In normal use, the trolley system 10 of the present invention can be moved using wheels 16 and rope handle 25. However, when stored, it is not always desirable to leave wheels 16 on the ground. For example, it may be preferred that the trolley position remain in one location during storage. This can be achieved by including using the locking devices which act on wheels 16. However, this approach leaves the wheels visible.

Figure 7:
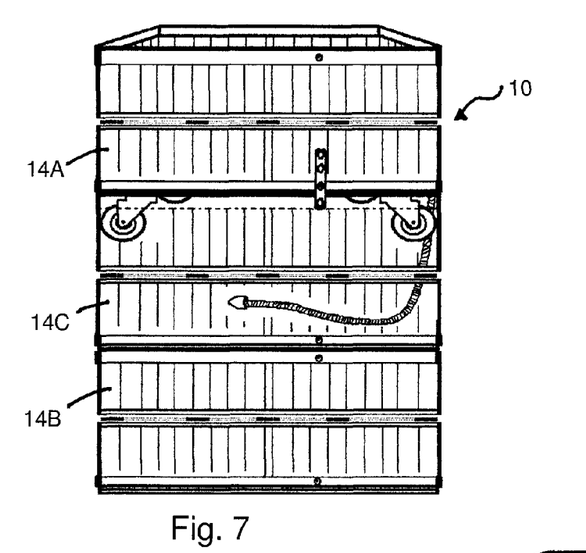
FIG. 7 is a perspective side view of the trolley system of FIG. 6, wherein the trolley system of the present invention, has been moved so that the wheels of the trolley system are positioned within the upper area of lower open transport container.

In FIG. 7, the trolley system shown in FIG. 6 has been re-arranged so that trolley system 10 (including base trolley assembly 12 and container 14A), has been moved so as to be placed at the top of stacked containers 14B and 14C. Wheels 16 and rope handle 25 both fit within container 14C, and recessed edge 36 fits within, and holds container support structure 18 within, perimeter 46 of collapsible container 14C In this configuration, wheels 16 are off the ground, and are less visible since they are housed within container 14C. Collapsible container 14B now rests directly on the ground.

Figure 8:
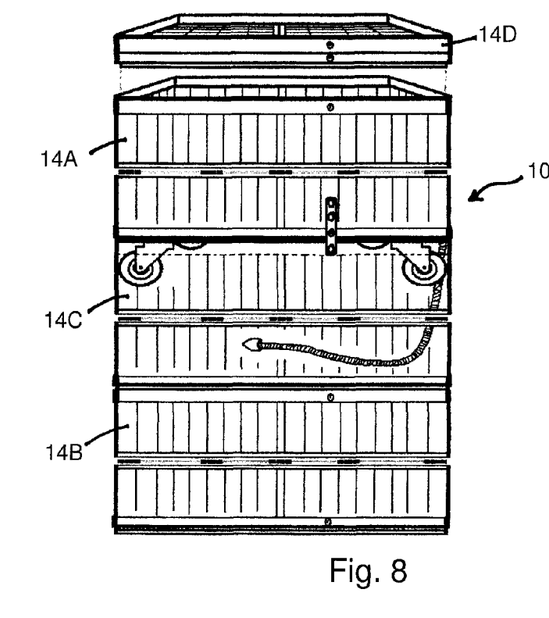
FIG. 8 is a perspective side view of the trolley system of FIG. 7, and having a further transport container, which acts as a cover.

In FIG. 8, a further embodiment similar to FIG. 7 is shown, and an additional container 14D is shown in a closed configuration. Container 14D can be fitted to the top of container 14A, so as to act as an upper cover or lid, if desired.

Figure 9:
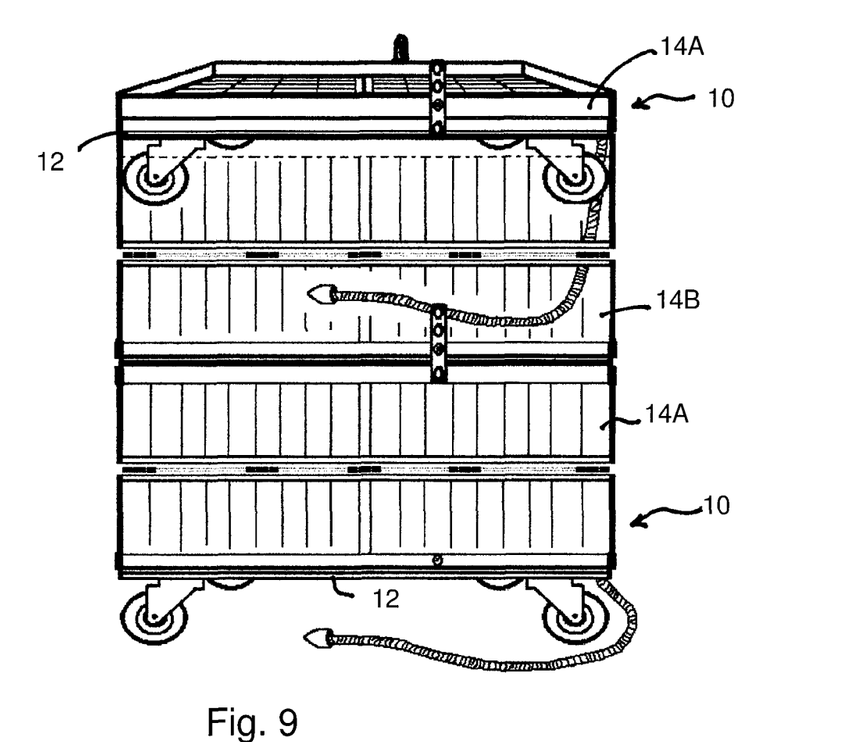
FIG. 9 is a perspective side view of a trolley system of the present invention, wherein two trolley systems are shown, together with one additional transport container.

In FIG. 9, a alternative arrangement is shown wherein two trolley systems 10 (including base trolley assembly 12, and collapsible container 14A) are shown in combination with a single additional collapsible container 14B. It will be clear that numerous arrangements and configurations can be utilized with the trolley systems and collapsible containers described herein.

Figure 10:
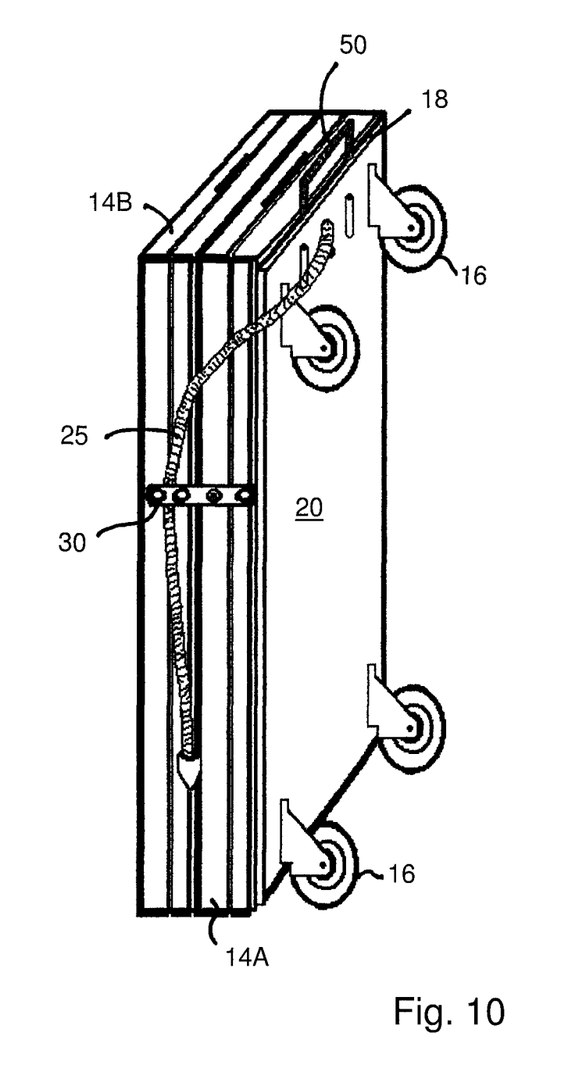
FIG. 10 is a perspective bottom view of the trolley system of FIG. 5 showing a retractable carrying handle.

In FIG. 10, the trolley system 10 and closed collapsible container 14B configuration from FIG. 5, are shown standing on one end. A retractable handle 50 is shown in a extended position, but which can be retracted or inserted back into support structure 18, when not required. Using handle 50, the entire configuration can be lifted as needed, such as when the system is to be placed in a vehicle trunk for transport. In this case, nylon straps 30 are used to hold collapsible containers 14A and 14B together, and maintain both in a closed configuration.

It will also be noted in FIG. 10, that strap 30 can act to hold rope handle 25 in place, for storage.

Thus, it is apparent that there has been provided, in accordance with the present invention, a stackable and collapsible trolley system which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Further, the invention illustratively disclosed herein suitably may be practiced in the absence of any element which is not specifically disclosed herein.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

We claim:

1. A trolley system for moving at least one foldably collapsible transport container, the system comprising:
    (a) a base trolley assembly having a support structure and having an upper bearing surface for receiving and supporting a transport container, the support structure being movable on a plurality of support wheels;
    (b) a first handle attached to said base trolley assembly to push, pull or otherwise direct the trolley system on said wheels; and
    (c) a first foldably collapsible transport container which is permanently fitted to said bearing surface, and adapted to receive and support additional foldably collapsible transport containers on top of said first collapsible transport container, and additionally having a strap on said first collapsible transport container for holding said collapsible transport container in a collapsed position, or to hold said additional collapsible transport containers in fixed attachment with said first collapsible transport container, with either said first or second foldably collapsible transport container being in either an open or closed orientation.

2. A trolley system as claimed in claim 1 wherein said base trolley assembly has a substantially rectangular support structure.

3. A trolley system as claimed in claim 1 wherein said additional foldably collapsible transport containers also comprise straps affixed to the sides of said containers which straps can be used to releasably hold all of said additional collapsible transport containers together, in either an open or closed orientation.

4. A trolley system as claimed in claim 1 comprising at least one additional foldably collapsible transport container, wherein each of said additional collapsible transport containers has a recessed edge on the bottom surface thereof, which recesses edge is adapted to fit into the upper surface of a collapsible container located below said additional collapsible transport container.

* * * * *